United States Patent [19]

Plunguian et al.

[11] 3,884,844

[45] May 20, 1975

[54] PROCESS FOR FORMING FOAMED POLYESTER RESINS

[76] Inventors: Mark Plunguian, 461 W. Chestnut Hill Rd., Newark, Del. 19711; Charles E. Cornwell, 7104 Marlan Dr., Alexandria, Va. 22307

[22] Filed: Mar. 11, 1974

[21] Appl. No.: 449,593

[52] U.S. Cl............. 260/2.5 N; 260/40 R; 260/861
[51] Int. Cl.............................................. C08g 53/10
[58] Field of Search................................. 260/2.5 N

[56] References Cited
UNITED STATES PATENTS

| | | | |
|---|---|---|---|
| 3,227,665 | 1/1966 | Fourcade et al. | 260/2.5 N |
| 3,230,184 | 1/1966 | Alford | 260/2.5 N |
| 3,232,893 | 2/1966 | Salgado et al. | 260/2.5 N |
| 3,252,923 | 5/1966 | Salgado et al. | 260/2.5 N |
| 3,260,688 | 7/1966 | Watanabe et al. | 260/2.5 N |
| 3,367,890 | 2/1968 | McManimie | 260/2.5 N |

FOREIGN PATENTS OR APPLICATIONS

| | | | |
|---|---|---|---|
| 652,770 | 5/1951 | United Kingdom | 260/2.5 N |

*Primary Examiner*—Morton Foelak

[57] ABSTRACT

Compositions of unsaturated polyester resin solutions formed by dissolving the condensation polymers of unsaturated dicarboxylic acids and dihydric alcohols in ethylenically unsaturated copolymerizable monomers may be foamed to give strong cured cellular structures by carrying out the copolymerization under subatmospheric pressure at a range of about 180 to 50 Torr, in the presence of blowing agents and a nucleating agent.

6 Claims, No Drawings

PROCESS FOR FORMING FOAMED POLYESTER RESINS

BACKGROUND OF THE INVENTION

This invention involves the use of unsaturated polyester resin compositions comprising: (a) an unsaturated polyester formed by condensing at least one dicarboxylic acid containing $\alpha, \beta$-ethylenic unsaturation and a dihydric alcohol and (b) an $\alpha, \beta$-ethylenically unsaturated copolymerizable monomer. Examples of ethylenically unsaturated dicarboxylic acids include maleic and fumaric acids. The remainder of the dicarboxylic acids may be either normal saturated aliphatics, such as adipic, succinic, and the like, or aromatic diacids, such as phthalic acid, isophthalic acid, or the like. Illustrative of dihydric alcohols are ethylene glycol, propylene glycol, 1,2-butanediol, and diethylene glycol. Examples of ethylenically unsaturated monomers are styrene, $\alpha$-methyl styrene, chlorostyrene, vinyl toluene, divinyl benzene, diallyl phthalate, and methyl methacrylate.

Such ethylenically unsaturated polyester resin solutions in ethylenically unsaturated monomers are very difficult to foam to a cured cellular structure, due to the temperaure gelling curve during the copolymerization reaction. After the addition of the catalyst and promoters to effect the copolymerization, the temperature starts to rise very slowly. Then, while still at a relatively low temperature, the resin suddenly gels. The exotherm may eventually reach 300°– 350° F, but by that time the copolymer has reached a rigid structure. Any blowing agent present will boil out from between the fissures without expanding the structure. Before reaching the gelling stage, the temperature is too low to effect vaporization of the blowing agent.

SUMMARY OF THE INVENTION

It has now been found that such copolymerizable resin solutions can be foamed to light weight, fine-celled, strong cellular structures when the copolymerization is carried out under subatmospheric pressure, such as in a vacuum desiccator, at a range of about 180 to 60 Torr, in the presence of an inert volatile liquid, or decomposable compound. The amounts of catalyst and promoter have to be controlled so that gelation occurs just after foaming. If gelation is retarded the foam will collapse. If the gelation is accelerated foaming will not occur.

The range of volatility of the blowing agent used will depend on the viscosity of the resin solution. At High viscosities, such as in the presence of a filler, Freon 113 (1,2,2-trifluoro-1,1,2-trichloro ethane) of a boiling point of 47.6° C can be used. With lower viscosity solutions we prefer to use blowing agents with boiling points under atmospheric conditions in the range of about 65° C to about 80° C. Examples of such blowing agents are methyl alcohol, ethyl alcohol, isopropyl alcohol, methylethyl ketone, and benzene, or any other compound which will release a gas under the conditions of this invention. When the resin solution is of relatively low viscosity (500 to 750 cps.) we have found that the addition of a small amount of water to the organic blowing agent helps to give a cured cellular structure. Without the water, the viscosity is too low to retain the volatile solvent long enough to form a stable foam. The addition of water retards the copolymerization reaction, so that more catalyst and promoter have to be added to effect the copolymerization. The greater the amount of water, the more catalyst is required to effect copolymerization.

Dispersing agents, surfactants, nucleating agents, cell stalilizers, flame retardants, fillers, and reinforcing agents may be added in preparing the foamed cellular materials of this invention.

Polyoxymethylene (20) sorbitan monoooleate (Tween 80, ICI America, Inc.) was found to be a preferred surfactant in practicing this invention. The preferred nucleating agents are aluminum powder flake (such as No. 3-XD of Reynolds Aluminum Company) and fumed silica (Cab-o-sil, Cabot Corporation). The use of fly ash as filler was found to be an especially desirable additive. This waste product of power plants is inexpensive and can be added in large percentages to the copolyester resins to form compositions of high strength.

The catalyst system can be any compound or mixture of compounds which generate free radicals under the given reaction conditions. These compounds are the peroxides or hydroperoxides, such as diacetyl peroxide, benzoyl peroxide, diethyl peroxide, hydrogen peroxide, methylethyl ketone peroxide, cumene hydroperoxide. Other free radical catalysts may also be used, as for example ammonium persulfates, perborates, and percarbonates. We have used methylethyl ketone peroxide (MEKP) in our work. Other peroxides or hydroperoxides will work as well.

Also required in conjunction with the free radical catalyst is an accelerator which increases the rate of decomposition of the peroxygen compound, thereby promoting the production of free radicals at a faster rate than can be achieved by the peroxygen compounds alone. This effect in turn greatly accelerates the rate of copolymerization. We have used cobalt naphthenate for this purpose. For some of our experiments we have diluted the 6% Co naphthenate of commerce to a 1.5% concentration with styrene for closer control of the copolymerization reaction.

A complexing agent to enhance the effectiveness of the accelerator is also used, such as various amino compounds. These agents are believed to act by reducing the cobaltic naphthenate to the more reactive cobaltous stage. We have used dimethylamine (DMA) for this purpose.

In carrying out the reaction, we have mixed the components by mechanical stirring in the following order: polymer solution, surfactant, filler, nucleating agent, blowing agent, peroxide, DMA, and cobalt naphthenate. The order of mixing is not too important as long as the cobalt compound is mixed in last, since this triggers the reaction. Efficient mechanical mixing is important to give a fine-celled uniform structure.

The mixed composition was placed in a vacuum desiccator and the vacuum pump turned on. Foaming of the polymer solution begins at a partial vacuum of about 150 Torr. The vacuum desiccator was closed off when the partial vacuum reached 70 Torr. The reaction was allowed to proceed under this vacuum to completion, past the exotherm stage. The exotherm is shown by the condensation of vapor on the lid of the desiccator.

DETAILED DESCRIPTION

The invention will now be described and illustrated by a number of examples. These experiments are summarized in Table 1.

Table 1

Summary of foaming experiments

| Experiment No. | Resin Solution (No.) | * | Viscosity (p.) | Filler (Fly Ash) (g.) | Tween 80 (g.) | Nucleating Agent | * | Blowing Agent | * | Water (g.) | MEK Peroxide (g.) | DMA (g.) | Go Naphthanate (6%) | 1.5% Solution (g.) | Resin Density (pcf) |
|---|---|---|---|---|---|---|---|---|---|---|---|---|---|---|---|
| 1 | 380-13 | 100 | 130 | — | 0.2 | Al | 1 | MeOH | 1 | — | 1 | 0.2 | | 0.9 | 20.6 |
| 2 | 380-2 | 100 | 25 | — | 0.2 | Al | 1 | EtOH | 1 | — | 1 | 0.2 | | 0.6 | 29.0 |
| 3 | 380-2 | 100 | 25 | — | — | Al | 1 | EtOH | 1 | — | 1 | 0.2 | | 0.6 | 53.5 |
| 4 | 380-2 | 100 | 25 | — | 0.2 | Cab-osil | 1 | EtOH | 1 | — | 1 | 0.2 | | 0.6 | 24.5 |
| 5 | 380-2 | 100 | 25 | — | 0.2 | Al | 1 | $C_6H_6$ | 4 | — | 1 | 0.2 | | 0.9 | 20.4 |
| 6 | 380-2 | 100 | 25 | — | 0.2 | Al | 1 | EtOH | 1.5 | — | 1 | 0.2 | | 0.6 | 22.0 |
| 7 | 380-2 | 100 | 25 | — | 0.2 | Al | 1 | EtOH | 1 | — | 1 | 0.2 | | 0.8 | 45.0 |
| 8 | 380-05 | 100 | 5 | — | 0.2 | Cab-osil | 1 | EtOH | 8 | — | 1 | 0.2 | | 0.6 | 65.2 |
| 9 | 380-05 | 100 | 5 | — | 0.2 | Cab-osil | 1 | MeOH | 8 | 3 | 2 | 0.3 | 1.1 | | 42.5 |
| 10 | 170-31 | 100 | 6 | 100 | 0.5 | Al | 1 | Fr'n | 4 | — | 1 | 0.2 | 0.1 | | 20.6 |
| 11 | 110-15 | 100 | 7.5 | 80 | 0.2 | Al | 1 | Fr'n | 0.2 | — | 1 | 0.2 | 0.2 | | 16.5 |
| 12 | 110-15 | 100 | 7.5 | 80 | 0.2 | Al | 1 | Fr'n | 2 | — | 1 | 0.2 | 0.2 | | 13.0 |
| 13 | 110-15 | 100 | 7.5 | — | 0.2 | Al | 1 | EtOH | 1 | — | 1 | 0.2 | — | 0.6 | 69.3 |
| 14 | 110-15 | 100 | 7.5 | — | 0.2 | Al | 1 | — | — | 6 | 2 | 0.3 | 1.1 | | 59.5 |
| 15 | 110-15 | 100 | 7.5 | — | 0.2 | Al | 1 | EtOH | 6 | 6 | 2 | 0.3 | 1.1 | | 39.6 |
| 16 | 110-15 | 100 | 7.5 | — | 0.2 | Al | 1 | MeOH | 6 | 6 | 2 | 0.3 | 1.2 | | 33.2 |
| 17 | 110-15 | 100 | 7.5 | — | 0.2 | Cab-osil | 1 | MeOH | 8 | 3 | 2 | 0.3 | 1.1 | | 11.6 |

*Amount (g.)

EXAMPLE 1

The high concentration (67/33, polymer/styrene solution), high viscosity (about 13,000 cps.) Atlac No. 382-13 was used for this experiment. The Atlac No. 382 series of polyester resins are polymerized propoxylated bisphenol-A fumarates produced by ICI America, Inc. 100 g. of this polymer solution in styrene was mixed with 0.2 g. Tween 80, 1 g. aluminum powder, 1 g. methyl alcohol, 1 g MEK peroxide, 0.2 g. DMA, and 0.9 g. 1.5% cobalt naphthenate. It was placed in a vacuum desiccator and connected to a water aspirator. When the partial vacuum in the desiccator reached 150 Torr, foaming started in the mass of the polymer solution. The desiccator was shut off when the partial vacuum reached 70 Torr. The polyester mass continued to expand in the evacuated desiccator as the temperature of reaction increased. The exotherm was indicated by vapor condensing on the lid of the desiccator, thus completing the run. The cured resin gave a density of 20.6 pounds per cubic foot (pcf.)

EXAMPLE 2

For this experiment the lower concentration, lower viscosity Atlac No. 382-2 polymer solution was used (60/40, polymer/styrene, about 2,500 cps.). The other conditions were the same as for Example 1, except that denatured ethyl alcohol was substituted for methyl alcohol and only 0.6 g. of 1.5% cobalt naphthenate was used as the promoter. This run gave a cured resin of 29.0 pcf. density.

EXAMPLE 3

The conditions for this experiment were the same as for Example 2, except that the surfactant Tween 80 was left out. This gave a final product of the greater density of 53.5 pcf.

EXAMPLE 4

The conditions for this experiment were the same as for Example 2, except that Cab-o-sil nucleating agent was substituted for the aluminum powder. A cured density of 24.5 pcf. was obtained for the copolymer.

EXAMPLE 5

In this experiment 4 grams benzene blowing agent was used and the 1.5% cobalt naphthenate solution was increased to 0.9 g., giving a cured copolymer density of 20.4 pcf.

EXAMPLE 6

This experiment is a repeat of Example 2, except that the blowing agent was increased to 1.5 g. denatured alcohol. A cured resin of 22.0 pcf. density was thus obtained.

EXAMPLE 7

When the concentration of cobalt naphthenate was increased by 25% over the amount used in Example 2, the accelerated reaction did not allow for the full expansion of the foamed structure, giving a cured density of 45.0 pcf.

EXAMPLE 8

Low viscosity solutions of polyester resin do not retain the blowing agent during evacuation. The volatile solvent is vaporized and escapes without causing any foaming. Thus, in this experiment with a 50/50, resin/styrene solution of polymer Atlac No. 382-05, with a viscosity of about 500 cps., the cured copolymer had the unfoamed density of 65.2 pcf.

EXAMPLE 9

When the experiment of Example 8 was repeated with the addition of a small amount of water to the blowing agent, the lower cured density of 42.5 pcf. was obtained. The catalyst concentration had to be increased to overcome the retarding effect of the water.

EXAMPLE 10

A flexible type unsaturated polyester resin solution in styrene (GR 17031) manufactured by Marco Chemical Company was used for this experiment. The solution was mixed with an equal weight of fly ash as filler, thus greatly increasing its viscosity. This gave a strong cured resin compound with a density of 20.6 pcf.

EXAMPLE 11

The following seven experiments were made with the rigid type Marco polyester solution No. 11015. This polymer solution is of too low a viscosity (750 cps.) to support a stable foam. However, when the viscosity of the solution was increased by adding fly ash filler, a low density cured resin composition of 16.5 pcf. was obtained.

EXAMPLE 12

The experiment of Example 11 was repeated with increased Freon 113 blowing agent. This gave a cured resin composition of 13.0 pcf.

EXAMPLES 13 and 14

Without filler and using ethanol blowing agent, no foaming was obtained, giving the normal cured density of 69.3 pcf. Example 14 shows that the addition of water by itself decreased the density only marginally to 59.5 pcf. As was found earlier (Example 9), the addition of water requires the use of increased catalyst and promoter concentrations to effect copolymerization.

EXAMPLE 15

When water was added to the alcohol blowing agent, foaming was effected and gave a cured resin of 39.6 pcf.

EXAMPLE 16

A further reduction in density compared to Example 15 was obtained when methanol was substituted for the ethanol blowing agent. This gave a cured resin of 33.2 pcf.

EXAMPLE 17

In this experiment the methanol was increased and the amount of water was reduced compared to Example 16. This gave a cured resin density of 11.6 pcf.

Processing techniques can be varied from those described in the above examples to obtain strong compositions of copolyester resins having the desired properties of controlled lower density and cellular structure. Accordingly such other modifications are contemplated which can be made within the spirit of the described invention.

What is claimed is:

1. A process for producing a cured cellular structure in a composition comprising (a) an unsaturated polyester formed by condensing at least one dicarboxylic acid containing $\alpha$, $\beta$-ethylenic unsaturation with a dihydric alcohol, (b) an $\alpha$, $\beta$-ethylenically unsaturated copolymerizable monomer, (c) a blowing agent, and (d) a nucleating agent, characterized by carrying out the copolymerization reaction under subatmospheric pressure at a range of about 180 to 50 Torr.

2. The process according to claim 1 in which a polyoxyethylene sorbitan monooleate is used as a surfactant.

3. The process according to claim 1 in which aluminum powder flake is used as nucleating agent.

4. The process according to claim 1 in which fumed silica is used as a nucleating agent.

5. The process and product according to claim 1 in which fly ash is used as a filler.

6. The process according to claim 1 in which water is used along with the blowing agent.

* * * * *